No. 751,471. Patented February 9, 1904.

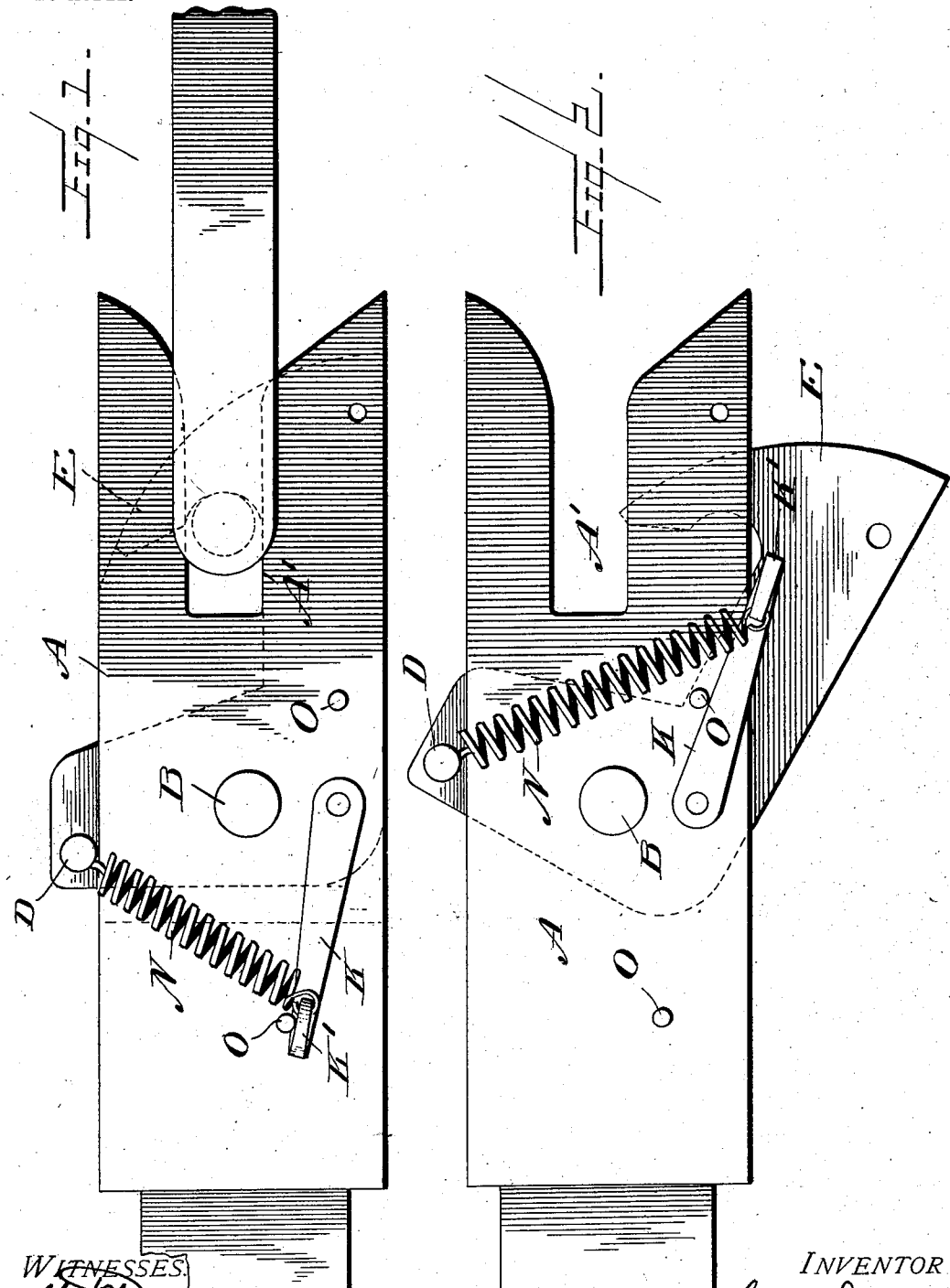

UNITED STATES PATENT OFFICE.

GOSHEN A. DECKER, OF LATHAM, OHIO.

TRACTION-COUPLING.

SPECIFICATION forming part of Letters Patent No. 751,471, dated February 9, 1904.

Application filed November 19, 1903. Serial No. 181,874. (No model.)

*To all whom it may concern:*

Be it known that I, GOSHEN A. DECKER, a citizen of the United States, residing at Latham, in the county of Pike and State of Ohio, have invented certain new and useful Improvements in Traction-Couplers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in couplers, and it relates more particularly to that class of coupling devices which are especially adapted for use in coupling traction-engines to threshing-machines; and the object of the invention is to produce an efficient coupler which will hold by means of a spring-actuated lever either in a position to receive the coupling-pin of an adjacent thresher, also means being provided for so holding the coupling-link that when two couplers come together they will not be coupled.

More specifically, the invention comprises a coupler having a pivotal hook mounted in a suitable casing and having a spring connected to an outer angled end of the hook and a lever connected to said spring and arranged so that when the spring buckles the hook may be held either in the slot of the casing or at one side of it.

My invention consists, further, in various details of construction and in combinations and arrangements of parts, which will be hereinafter fully described and then specifically defined in the appended claims.

I illustrate my invention in the accompanying drawings, in which—

Figure 1 is a side view of my improved coupler, showing the hook held in a position to engage a pin of an adjacent thresher. Fig. 2 is a similar view showing the hook held out of the slot of the casing.

Reference now being had to the details of the drawings by letter, A designates a casing or coupling-head which may be of any suitable size and constructed of metal or other material. Said coupler or casing has an elongated slot A' in one end and has a chambered portion, in the walls of which a pin B is mounted. E designates a hook which is mounted upon said pin B and is adapted to have a play in the chambered portion of the casing A. Projecting from the outer angled portion of the hook is a pin D, and said pin is so positioned that when the hook is thrown in one direction or the other it will contact with the edge of the casing to limit the throw of the hook. Pivoted on one side of the casing is a lever K, one end of which is turned to form an eye or hook K', and N designates a spring fastened at one end to said hook or eye and its other end fastened to the lug D.

O O designate lugs positioned as shown in the drawings and provided for the purpose of stops to limit the throw of the lever K in one direction or the other, accordingly as the spring is made to buckle and hold the lever against one lug or the other, for the purpose of throwing the link in the position shown in Figs. 1 and 2 of the drawings. When the lever is thrown in one direction—to the left, for instance—the hook will be held with its free end across the slot and in position to engage and hold the pin of another coupler, while when the lever is thrown in the opposite direction—to the right, (shown in Fig. 2)—the hook will be held away from the slot or in the position shown in Fig. 2.

From the foregoing it will be observed that by the provision of a coupler embodying the features of my invention an engine or thresher equipped with the same may quickly and automatically be coupled.

While I have shown a particular construction of apparatus embodying the features of my invention, it will be understood that I may make alterations in the detailed construction of the invention, if desired, without in any way departing from the spirit of the invention.

Having thus described my invention, what I claim as new, and desire to secure by Letters Patent, is—

1. A coupler comprising a chambered casing having a slotted end, a hook pivotally mounted within said casing, a lever pivotally mounted upon the casing, a spring connected at one end to said lever and its other end to a projection upon one end of the hook, said spring adapted to buckle and hold the free end of the hook yieldingly across said slot or at one side thereof, as set forth.

2. A coupler comprising a chambered casing having a slotted end, a hook pivotally mounted within said casing, a lug projecting from an angled end of said hook, a lever pivoted to the casing, stops upon the casing to limit the throw of the lever in opposite directions, and a spring connected at one end to said lug and its other end to said lever, as set forth.

In testimony whereof I hereunto affix my signature in presence of two witnesses.

GOSHEN A. DECKER.

Witnesses:
   Jas. Hosler,
   V. S. McCoy.